Patented Nov. 11, 1952

2,617,786

UNITED STATES PATENT OFFICE 2,617,786

POLYAMIDE RESINS FROM DINITRILES AND FORMALDEHYDE

David T. Mowry, Dayton, Ohio, assignor to Monsanto Chemical Company, St. Louis, Mo., a corporation of Delaware No Drawing. Application December 30, 1947, Serial No. 794,818

9 Claims. (Cl. 260—67)

This invention relates to polyamide linear condensation polymers useful in fiber and film fabrication. More particularly the invention relates to novel methods of preparing linear polyamides of high molecular weight.

High molecular weight linear polyamides having a regularly recurring structural component in their molecules are well known and have a wide application in the resin industry. These are usually prepared by the condensation of diamines with dibasic acids, or reactive derivatives of dibasic acids. The primary purpose of this invention is to provide a method of preparing a family of polyamides which are homologous to many known resins, but which cannot be prepared by the usual condensation of diamines with dibasic acids, or derivatives thereof. A further purpose of this invention is to synthesize new resins having valuable chemical and physical properties.

The new resinous polyamides have the general molecular structure:

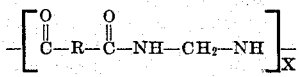

wherein X is a whole number indicating the extent of polymerization, and which represents the number of regularly recurring units in the polymeric molecule, and in which R is an aliphatic divalent hydrocarbon, oxa-hydrocarbon, or thia-hydrocarbon radical. In the above structural formula the R radical may be ethylene, trimethylene, tetramethylene, higher polymethylenes, 2 - oxa - 1,3 - propylene, 3 - oxa - 1,5 - pentylene, 3-thia-1,5-pentylene and homologous radicals. The divalent hydrocarbon, oxa-hydrocarbon and thia-hydrocarbon radicals may have branched chains, for example, the following radicals: 1,2-propylene, 2-methyl-1,4-butylene, and 2,4,4-trimethyl-1,4-butylene. Aromatic and aliphatic radicals are also included, for example 1,4-phenylene, 1,3-phenylene, p-xylylene, p-toluylene, and the various isomers and homologues thereof. Generally the longer aliphatic chains are preferred, for example those in the following radicals, heptamethylene, octamethylene and homologous radicals as well as the radicals in which one or more of the CH₂ linkages have been replaced by oxygen or sulfur radicals. In the practice of this invention preferred compositions are prepared in which the divalent radical R of the above structural formula has from two to 12 atoms in the shortest straight chain between the two valence bonds of the said radical.

The new polyamide resins are prepared by the condensation of difunctional nitriles with formaldehyde. In the practice of this invention monomeric formaldehyde may be used, or a polymeric formaldehyde, such as paraformaldehyde or trioxane. Suitable dinitriles, useful in the practice of this invention are succinonitrile, adiponitrile, azelaonitrile, 4-oxa-pimelonitrile, 4,7-dioxa-suberonitrile, 4-thia-pimelonitrile, terephthalonitrile, 2-methyladiponitrile, methyl succinonitrile and p-xylylene dicyanide.

The new reaction between formaldehyde and nitriles is catalyzed by means of acid catalysts, for example any acid which has an ionization constant at least as great as that of phosphoric acid and hydrolyzable salts of those acids. Useful catalysts in the practice of this invention are sulfuric acid, hydrochloric acid, boron trifluoride, aluminum chloride, benzene sulfonic acid, toluene sulfonic acid, a half alkyl ester of sulfuric acid and zinc chloride. The reaction is preferably conducted by slowly combining the reagents in an aqueous medium at a low or moderate temperature which permits a rapid but not excessive reaction. The reaction temperature will depend upon the selection of the reagents and catalysts, and where active catalysts and active reagents are used it is sometimes necessary to add reagents slowly and to cool the reaction mass in order to maintain a controllable reaction. Generally temperatures between 20 and 50° C. are suitable, but with less active catalysts it may be necessary to heat to temperatures as high as 80° C. to effect the completion of the reaction. It is frequently desirable to conduct the reaction in the presence of solvents, such as formic acid, glacial acetic acid, acetic anhydrides or propionic acid or organic solvents, such as hexane, dioxane and benzene, which assist in minimizing the precipitation of polymer during the reaction.

The new compositions are solid resinous polymers which can be prepared with a wide range of molecular weights. The ultimate use of the composition will depend upon the degree of polymerization and the molecular structure. The molecular weight can be measured by means of the conventional relationship between solution viscosity and the molecular weight in the manner known to the art. Such viscosities are useful in following the course of the reaction and in determining the utility of the composition for fiber and film preparation. In general for fiber preparation polymers having specific viscosities in one percent solution in 90 percent phenol in excess of 0.3 or 0.4 are particularly useful. Polymers having phenol solution viscosities less than 0.3 are particularly useful in the adhesive and plasticizer fields. Very high molecular weight materials, which probably have cross-linked structures, may be insoluble in phenol.

Further details of the preparation of the new compositions are set forth with respect to the following specific examples.

Example 1

Thirty-five grams of 4,7-dioxasuberonitrile, (obtained from the reaction of ethylene glycol and two molecules of acrylonitrile) and 6.15 grams of trioxane were dissolved in 200 cc. of formic acid. Then 80 grams of concentrated sulfuric acid was added with stirring and cooling to keep the temperature below 30° C. After four hours the product was poured into a cold solution of 80 grams of sodium hydroxide in 2-liters of water. The solid which precipitated was filtered, washed with a little water and dried. This was identified as polymethylene-4,7-dioxasuberamide and found to have a melting point of 200° C.

Example 2

A solution of 50 grams concentrated sulfuric acid, 2 cc. of water and 7.9 grams of 95 percent paraformaldehyde was added slowly with cooling to a clear solution of 20 grams of succinonitrile in 60 cc. glacial acetic acid. The temperature was maintained between 25° C. and 40° C. during the addition and was then warmed to 55 to 60° C. for five hours. A curdy precipitate developed almost immediately after addition was completed. It was then poured with stirring into two liters of methanol and washed by trituration and filtration, successively with ethanol, acetone and dioxane. The high melting polymethylene succinamide obtained in 98 percent yield was a white powder insoluble in common organic solvents.

Example 3

A mixture of 41 grams of sebaconitrile and 50 cc. of 85 percent phosphoric acid placed in a flask and a solution of 7.6 grams of trioxane in 100 cc. 85 percent phosphoric acid was added dropwise with stirring and cooling so that the temperature did not exceed 30° C. The reaction was then stirred for ten hours and hydrolyzed by pouring into water. The white powder was then washed with dilute potassium carbonate solution and water and dried. A 91 percent yield of polymethylene sebacamide, melting at 165–190° C. was obtained.

In another preparation, a solution of 7.7 grams of trioxane in 100 cc. formic acid was added to a mixture of 41 grams sebaconitrile, 100 cc. formic acid, and 52 grams concentrated sulfuric acid. After five hours stirring the viscous solution was hydrolyzed, filtered and washed to give a 95 percent yield of polymethylene sebacamide, m.p. 245–250° C. It was readily soluble in phenol and formic acid but not soluble in other common organic solvents. Fibers were readily spun from the melted resin.

Example 4

A solution of 27 grams of adiponitrile in 100 cc. of dioxane was treated with a solution of 7.9 grams paraformaldehyde in 52 grams of 94 percent sulfuric acid. The temperature rose to 70° C. during the course of the addition and a thick precipitate formed. The gelatinous mass was hydrolyzed after two hours by addition to a vigorously stirred excess of 50 percent alcohol. The polymethylene adipamide powder after filtering, washing and drying was obtained in 80 percent yield. It had a melting point of 306° C.

Example 5

A solution of 37.5 grams of azelaonitrile and 7.7 grams of trioxane in 300 ml. of 98–100 percent formic acid was prepared and cooled to 0° C. To this was added in a 5–10 minute period 100 grams of concentrated $H_2SO_4$ with an immediate rise in temperature to 25° C. As the reaction occurred, the temperature of the solution was kept below 30° C. by cooling with ice and water. At timed intervals an aliquot was removed and hydrolyzed in water, washed with water, dilute $Na_2CO_3$ solution, and again with water before air drying. The results are tabulated below:

| Time (hours) | Conversion | Viscosity (1%) in 90% Phenol |
|---|---|---|
| | Percent | |
| 0.5 | 61.5 | 0.06 |
| 1.0 | 73.4 | 0.08 |
| 2.0 | 83.5 | 0.22 |
| 3.0 | 88.0 | 0.51 |
| 4.0 | 91.0 | 1.20 |
| 5.0 | 94.0 | 1.05 |
| 7.25 | 99.7 | .60 |
| 8.25 | 95.5 | .36 |

In the above example the molar ratio of sulfuric acid to dinitrile was 4.0. When the ratio was reduced to 3.0, the maximum specific viscosity in phenol observed was 0.81. When the ratio of sulfuric acid to dinitrile was further reduced to 2.0 the maximum observed viscosity was 0.39. Samples of polymethylene azelamide having specific viscosities in excess of 0.2–0.3 were readily drawn into fibers from the melt.

Polymethylene azelamide was also prepared from azelaonitrile and formaldehyde by similar techniques involving the use of other strongly acidic catalysts in formic acid solution. Typical conversions and product viscosities are given in the table below:

| Catalyst | Conversion | Specific Viscosity at 1% in 90% Phenol |
|---|---|---|
| | Percent | |
| 85% Phosphoric Acid | 79 | 0.32 |
| Anhydrous Hydrogen Chloride | 84 | 0.16 |
| 37% Hydrochloric Acid | 97 | 0.15 |
| Boron Fluoride-Ethyl Ether Compound | 89 | 0.26 |

To obtain linear polymers soluble in phenol or formic acid it was desirable to employ a molar ratio of formaldehyde to dinitrile of about 1.0. Higher concentrations of formaldehyde resulted in the formation of gels as shown in the table below:

| Formaldehyde-Azelaonitrile Ratio | Reaction State | Specific Viscosity at 1% in 90% Phenol |
|---|---|---|
| 0.984 | No Gel | 0.23 |
| 1.012 | do | Insoluble |
| 1.024 | Gel in 24 hrs | Do. |
| 1.039 | Gel in 1.5 hrs | Do. |

The gelation or cross-linking reaction was also delayed by the use of larger quantities of solvent.

Example 6

A 124 gram quantity of 4-oxa-pimelonitrile (di-cyanoethyl ether) was dissolved in 200 cc.

glacial acetic acid. To this was added slowly a solution of 31.6 grams of paraformaldehyde in 115 cc. of 94 percent sulfuric acid. The addition was carried out with stirring and cooling to keep the temperature at 35–40° C. After one hour the temperature was raised to 50–60° C. for two hours. After quenching the product by pouring into two liters of 80 percent alcohol the precipitate was filtered and washed with water and aqueous acetone. There was obtained 109 grams (64% yield) of white powder, melting at 243–246° C. The white powder was insoluble in dioxane, acetone, ethanol, ethyl acetate, ethylene dichloride, carbon tetrachloride, hexane, and dimethyl formamide, but was readily soluble in 90 percent phenol. It was identified as polymethylene-4-oxa-pimelamide.

Although the invention has been described with respect to specific embodiments thereof, it is not intended that the details should be construed as limitations upon the scope of the invention except to the extent incorporated in the following claims.

I claim:

1. A method of preparing water-insoluble linear polyamide resins which comprises mixing a dinitrile having the structural formula: NC—R—CN, wherein —R— is a divalent radical having a chain of from two to 12 atoms between the valence bonds and is selected from a group consisting of saturated aliphatic hydrocarbon radicals, aromatic hydrocarbon radicals, hydrocarbon radicals containing both saturated aliphatic and aromatic structures, and the oxa- and thia-hydrocarbon radicals wherein each oxygen and sulfur atom is located in an aliphatic chain between two methylene radicals, both adjacent to the said atom, with approximately one molecular weight of formaldehyde per mole of dinitrile in the presence of an acid catalyst at least as strong as phosphoric acid to form a condensation polymer of the dinitrile and formaldehyde and thereafter subjecting the resulting compound to the action of water.

2. The method defined by claim 1 wherein the dinitrile is adiponitrile.

3. The method defined by claim 1 wherein the dinitrile is sebaconitrile.

4. The method defined by claim 1 wherein the dinitrile is azelaonitrile.

5. The method defined by claim 2 wherein the acid is sulfuric acid.

6. The method defined by claim 3 wherein the acid is sulfuric acid.

7. The method defined by claim 4 wherein the acid is sulfuric acid.

8. A method for preparing water-insoluble fiber forming linear polyamide resins which comprises (A) reacting a homogeneous mixture of a dinitrile having the structural formula: NC—R—CN wherein —R— is a polymethylene radical of 2 to 8 carbon atoms, approximately one molecular weight of formaldehyde per mole of dinitrile, concentrated sulfuric acid, and formic acid, the water content of the mixture being in molar excess of the number of moles of the dinitrile, and the weight of the concentrated sulfuric acid being in excess of the combined weight of the dinitrile and formaldehyde, to form a condensation polymer of the dinitrile and formaldehyde, and (B) thereafter subjecting the resulting compound to the action of water to obtain a polyamide resin, the reaction (A) being continued for a length of time such that the polyamide resin resulting from step (B) is capable of being drawn into fibers from a melt thereof.

9. A method for preparing water-insoluble fiber forming linear polyamide resins which comprises (A) reacting a homogeneous mixture of a dinitrile having the structural formula: NC—R—CN wherein —R— is a polymethylene radical of 2 to 8 carbon atoms, approximately one molecular weight of formaldehyde per mole of dinitrile, and 85% phosphoric acid, the water content of the mixture being in molar excess of the number of moles of the dinitrile, and the weight of the 85% phosphoric acid being in excess of the combined weight of the dinitrile and formaldehyde, to form a condensation polymer of the dinitrile and formaldehyde, and (B) thereafter subjecting the resulting compound to the action of water to obtain a polyamide resin, the reaction (A) being continued for a length of time such that the polyamide resin resulting from step (B) is capable of being drawn into fibers from a melt thereof.

DAVID T. MOWRY.

REFERENCES CITED

The following references are of record in the file of this patent:

UNITED STATES PATENTS

| Number | Name | Date |
|---|---|---|
| 2,096,181 | Jahrstorfer et al. | Oct. 19, 1937 |
| 2,239,440 | D'Alelio | Apr. 22, 1941 |
| 2,333,623 | Rust | Nov. 2, 1943 |
| 2,359,708 | Bruson | Oct. 3, 1944 |

OTHER REFERENCES

Shreve, The Chemical Process Industries, McGraw-Hill Book Co., 1945, page 361.